United States Patent [19]
Hiraiwa et al.

[11] Patent Number: 5,781,661
[45] Date of Patent: Jul. 14, 1998

[54] HANDWRITTING INFORMATION DETECTING METHOD AND APPARATUS DETACHABLY HOLDING WRITING TOOL

[75] Inventors: Akira Hiraiwa, Yokosuka; Masaaki Fukumoto, Yokohama; Tadasu Uchiyama, Yokosuka; Noboru Sonehara, Zushi; Shigeru Oikawa, Yokosuka, all of Japan

[73] Assignee: Nippon Telegraph and Telephone Corporation, Tokyo, Japan

[21] Appl. No.: 495,837

[22] Filed: Jun. 28, 1995

[30] Foreign Application Priority Data

| Jun. 29, 1994 | [JP] | Japan | 6-147415 |
| Jul. 8, 1994 | [JP] | Japan | 6-156969 |
| Jul. 25, 1994 | [JP] | Japan | 6-172756 |

[51] Int. Cl.[6] ............................................. G06K 9/00
[52] U.S. Cl. ..................... 382/188; 382/107; 382/119; 382/122; 382/189
[58] Field of Search ....................... 382/107, 116, 382/119, 120, 121, 122, 188, 189, 123

[56] References Cited

U.S. PATENT DOCUMENTS

| 3,145,367 | 8/1964 | Crane. | |
| 3,906,444 | 9/1975 | Crane et al. | 340/146.354 |
| 3,915,015 | 10/1975 | Crane et al. | 73/432 R |
| 3,930,229 | 12/1975 | Crane et al. | 340/146.354 |
| 4,040,010 | 8/1977 | Crane et al. | 340/146.354 |
| 4,086,576 | 4/1978 | Jebb et al. | 340/272 |
| 4,142,175 | 2/1979 | Herbst et al. | 340/146.3 |

(List continued on next page.)

FOREIGN PATENT DOCUMENTS

| 62-140130 | 6/1987 | Japan | G06F 3/03 |
| 3-156519 | 7/1991 | Japan | G06F 3/033 |
| 4-195321 | 7/1992 | Japan | G06F 3/033 |
| 4-256009 | 9/1992 | Japan | G06F 3/033 |
| 4-282717 | 10/1992 | Japan | G06F 3/03 |
| 5-278390 | 10/1993 | Japan | B43K 29/00 |
| 6-102995 | 4/1994 | Japan | G06F 3/033 |
| 6-95800 | 4/1994 | Japan | G06F 3/033 |
| 6-139000 | 5/1994 | Japan | G06F 3/03 |

OTHER PUBLICATIONS

Hiraiwa et al., "Physiological Stress Change by Means of Noninvasive Measurement of Arterial Pressure and Mechanical Properties", the Proceedings of 3rd Symposium on Human Interface, pp. 61–66 (1987).

Nabishima et al., "Reconstructing a Whole Picture from a Series of Partial Pictures", Technical Report of IEICE, 94(141):1–8 (1994).

*Primary Examiner*—Bipin Shalwala
*Attorney, Agent, or Firm*—Finnegan, Henderson, Farabow, Garrett & Dunner, L.L.P.

[57] ABSTRACT

The purpose of the present invention is to provide a handwriting information detecting method and apparatus for the same, in which a user can choose any handwriting tool such as a pen or a pencil, and when the user writes with the tool, the handwriting information can be detected. The handwriting information detecting method of the present invention comprises steps of detecting a motion of a writing tool, held by a writing tool holder comprising at least one acceleration sensor, based on at least one acceleration signal output from the at least one acceleration sensor when the writing tool is grasped by fingers; and recognizing handwriting information of a character or a figure written by the writing tool according to the detected motion thereof, and outputting the information. Preferably, the step of detecting a motion of a writing tool further comprises steps of detecting pressure acting on the tip of a finger which grasps the writing tool; and judging the motion of the writing tool according to the detected pressure. The handwriting information detecting apparatus of the present invention comprises a writing tool holder for detachably holding a writing tool; at least one acceleration sensor, provided at the writing tool holder, for detecting acceleration of the writing tool which is grasped by fingers; and a handwriting information recognition circuit for recognizing information of handwriting performed by the writing tool based on the output of the at least one acceleration sensor.

37 Claims, 18 Drawing Sheets

U.S. PATENT DOCUMENTS

| | | | |
|---|---|---|---|
| 4,156,911 | 5/1979 | Crane et al. | 364/419 |
| 4,345,239 | 8/1982 | Elliott | 340/146.354 |
| 4,513,437 | 4/1985 | Chainer et al. | 382/120 |
| 4,751,741 | 6/1988 | Mochinaga et al. | 382/188 |
| 4,856,077 | 8/1989 | Rothfjell | 382/123 |
| 4,896,543 | 1/1990 | Gullman | 73/862.04 |
| 5,018,208 | 5/1991 | Gladstone | 382/121 |
| 5,107,541 | 4/1992 | Hilton | 382/123 |
| 5,215,397 | 6/1993 | Taguchi et al. | 382/188 |
| 5,294,792 | 3/1994 | Lewis et al. | 382/188 |

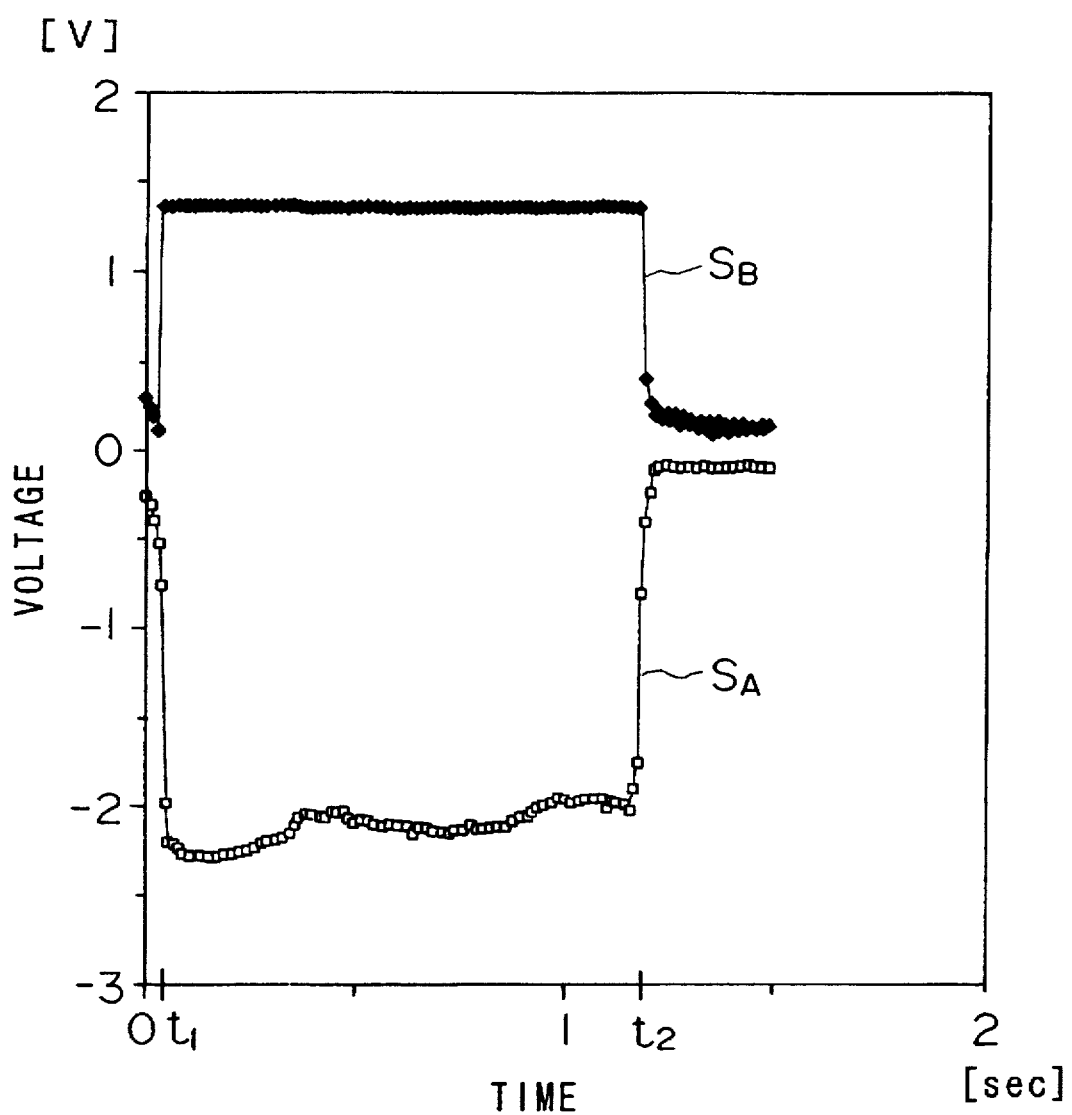

FIG.19
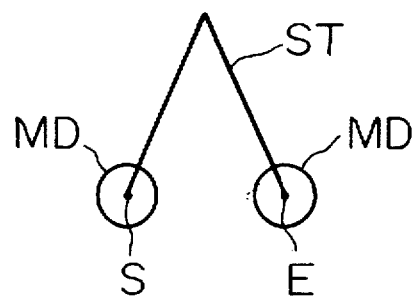
FIG.20A
FIG.20B
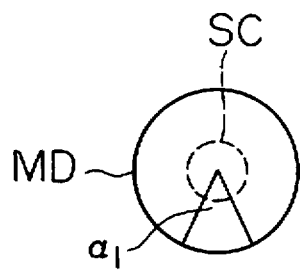
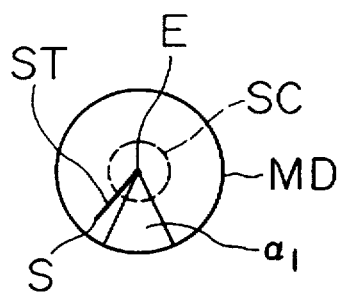
FIG.21
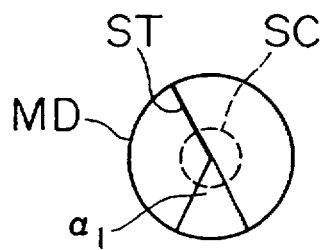

HANDWRITTING INFORMATION DETECTING METHOD AND APPARATUS DETACHABLY HOLDING WRITING TOOL

BACKGROUND OF THE INVENTION

1. Field of the Invention

The present Invention relates to a handwriting information detecting method and an apparatus for implementing the method, in order to input handwriting information such as characters, figures, drawings, and so on produced by writing tools into a computer and the like.

2. Background Art

Up to now, keyboards, mouses, and tablets have been used as devices for inputting character or figure information. In addition, as better portable information-input devices, many apparatus have been proposed, in which the locus of a character or a figure written by a pen grasped by a user is detected by means of twice integrating output signals of acceleration sensors which are built into the pen, and the detected information can be input into any computer (see Japanese Patent Application First Publication Nos. Hei 3-156519, Hei 4-195321, Hei 4-256009, Hei 4-282717 and so on).

In such pens with built-in acceleration sensors, a pressure sensitive sensor may be attached at the axis of the pen for detecting up and down motions of the pen relative to the paper or the surface of the desk (see Japanese Patent Application First Publication No. Hei 3-156519).

Usually, humans use different hand-writing tools such as mechanical pencils, fountain pens, ball-point pens, marker pens, water-paint pens, pencils, writing brushes, and paint-brushes according to their tastes or writing smoothness. However, in the case of a pen with a built-in acceleration sensor, there occurs a problem that the user is forced to use a fixed and specific pen.

On the other hand, another kind of pen with built-in acceleration sensors has also been proposed. In this case, a ball-point cartridge is provided at the end of the pen, and when a user writes on paper by using the pen, acceleration signals are processed to input the locus of the pen to a computer (see Japanese Patent Application First Publication No. Hei 4-282717). However, in all the above cases, an exclusive pen has been needed and it has been impossible to change the pen.

On the other hand, another art has also been proposed, in which the cross section of a pen is made to be an inverse triangle in order that axial directions of the acceleration sensors are easily determined when the user grasps the pen (see Japanese Patent Application First Publication No. Sho 62-140130). However, a problem with such a pen is that it is hard to grasp in comparison with usual pens.

SUMMARY OF THE INVENTION

Therefore, one object of the present invention is to provide a handwriting information detecting method and apparatus for the same, in which a user can choose any handwriting tool such as a pen or a pencil, and when the user writes with the tool, the handwriting information can be detected.

Another object of the present invention is to provide a handwriting information detecting method and apparatus for the same, in which the down and up motions of the writing tool can be correctly sensed.

Another object of the present invention is to provide a handwriting information detecting apparatus, in which the axial directions of the acceleration sensors can be determined when the user grasps the pen, without making the cross section of the pen a form which is difficult to grasp, as with the inverse triangle form.

Other objects of the present invention will be apparent by the following description and the appended figures.

Therefore, the present invention provides a handwriting information detecting method comprising steps of: detecting a motion of a writing tool, held by a writing tool holder comprising at least one acceleration sensor, based on at least one acceleration signal output from the at least one acceleration sensor when the writing tool is grasped by fingers; and recognizing handwriting information of a character or a figure written by the writing tool according to the detected motion thereof, and outputting the information.

Preferably, the step of detecting a motion of a writing tool further comprises steps of: detecting pressure acting on the tip of a finger which grasps the writing tool; and judging the motion of the writing tool according to the detected pressure.

The present invention also provides a handwriting information detecting apparatus comprising: a writing tool holder for detachably holding a writing tool; at least one acceleration sensor, provided at the writing tool holder, for detecting acceleration of the writing tool which is grasped by fingers; and a handwriting information recognition circuit for recognizing information of handwriting performed by the writing tool based on the output of the at least one acceleration sensor.

Preferably, X- and Y-axis acceleration sensors, the axes corresponding to those of the two dimensional rectangular coordinates assigned to a writing surface for the writing tool, are provided as the at least one acceleration sensor; and the writing tool holder is grasped with the writing tool by the fingers, and has a grasping part for orienting the direction of the writing tool holder so as to align the axial directions of the X- and Y-axis acceleration sensors in predetermined directions.

According to the present invention, any writing tool can be held by the writing tool holder which provides the at least one acceleration sensor; thus, there is an advantage that each user can choose the writing tool which he likes. Additionally, because of the grasping part provided in the apparatus, the direction of the apparatus when the user grasps the writing tool and the holder is oriented in a fixed direction; thus, it is possible to ensure that each of at least one axial direction of the at least one acceleration sensor provided at the writing tool holder is aligned in a predetermined direction. Therefore, the user does not need to take care of the axial direction of the acceleration sensor, by which the level of comfort in using such apparatus is improved.

The following devices may be considered as fields of application for the present invention: input devices for portable PDAs (Personal Digital Assistant); input devices for interactive pagers; voucher-writing devices, used in restaurants or express home-deliveries, for transmitting characters (including numerical characters) to the register with the handwriting remaining on paper; and devices for character-recognition of the contents of clinical records in a hospital while the records are written on paper using a pen, and for inputting the contents into a computer.

BRIEF EXPLANATION OF THE DRAWINGS

FIG. 13 shows the result of the above experiment.

FIG. 19 is for the purpose of explaining starting and end points of the motion of one stroke during writing a character according to the third embodiment.

FIGS. 20A and 20B are for the purpose of explaining monitor images of the neighborhood of a starting point.

FIG. 21 is for the purpose of explaining a monitor image of the neighborhood of an end point.

DETAILED DESCRIPTION OF PREFERRED EMBODIMENTS

Hereinafter, examples of the handwriting information detecting apparatus according to the present invention will be explained with reference to the figures.

First Embodiment

The handwriting information detecting apparatus as an embodiment of the present apparatus will be explained below.

Example of the Apparatus

Figure 1:
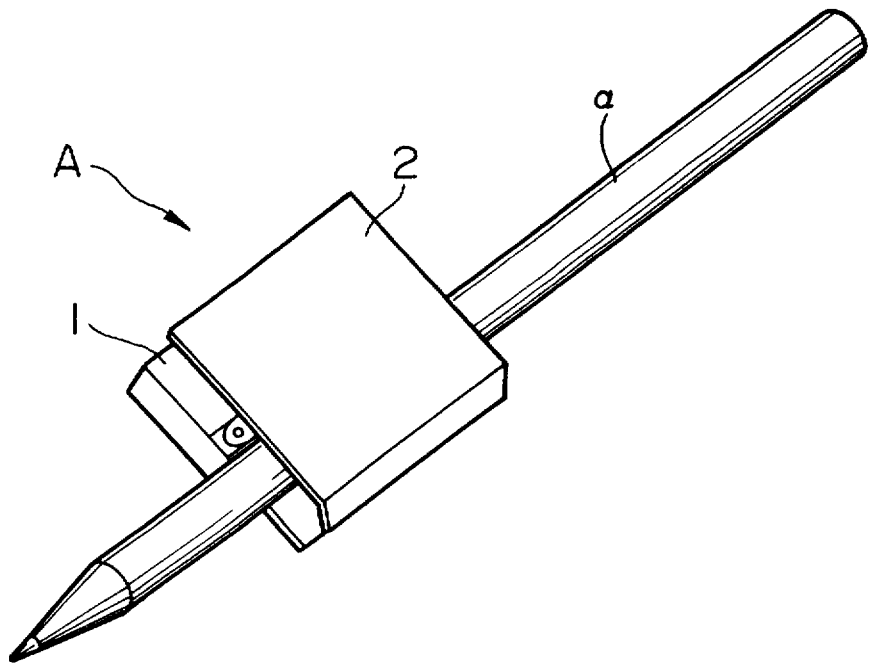
FIG. 1 is a perspective view of the handwriting information detecting apparatus of the first embodiment according to the present invention holding a pencil.
Figure 2:
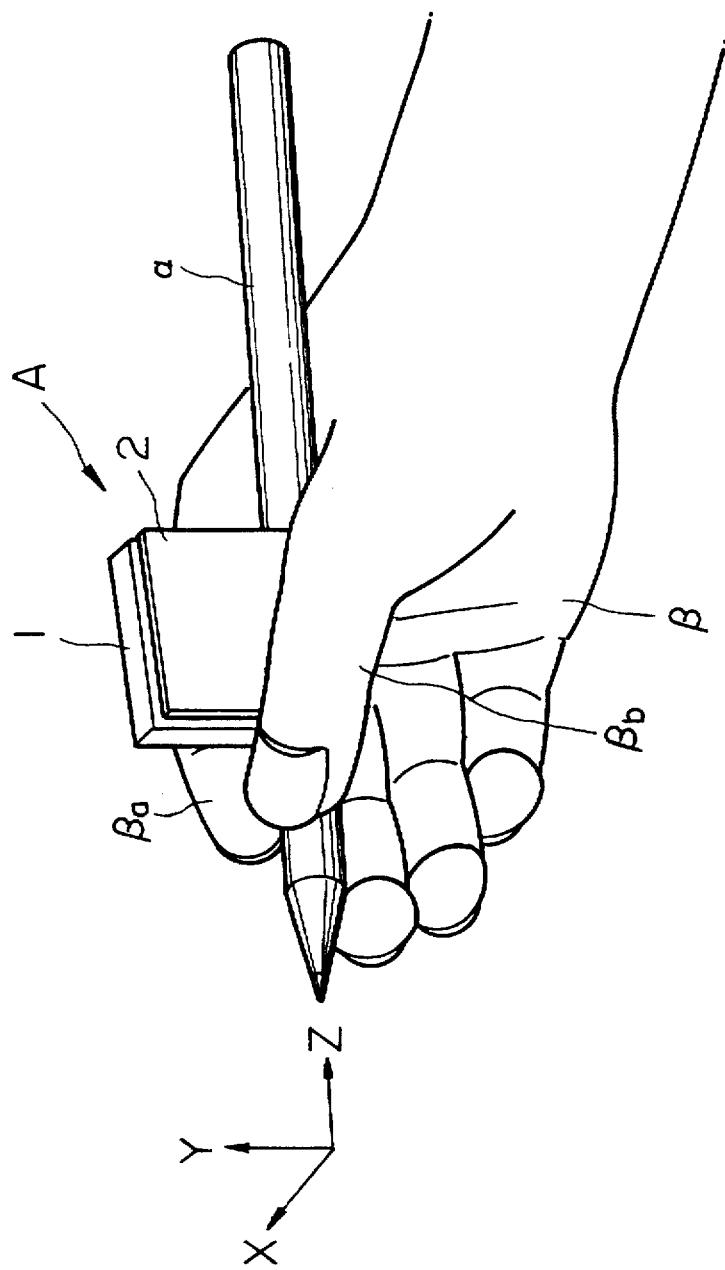
FIG. 2 is a perspective view of the detecting apparatus of FIG. 1 holding a pencil and being grasped by a user.
Figure 3:
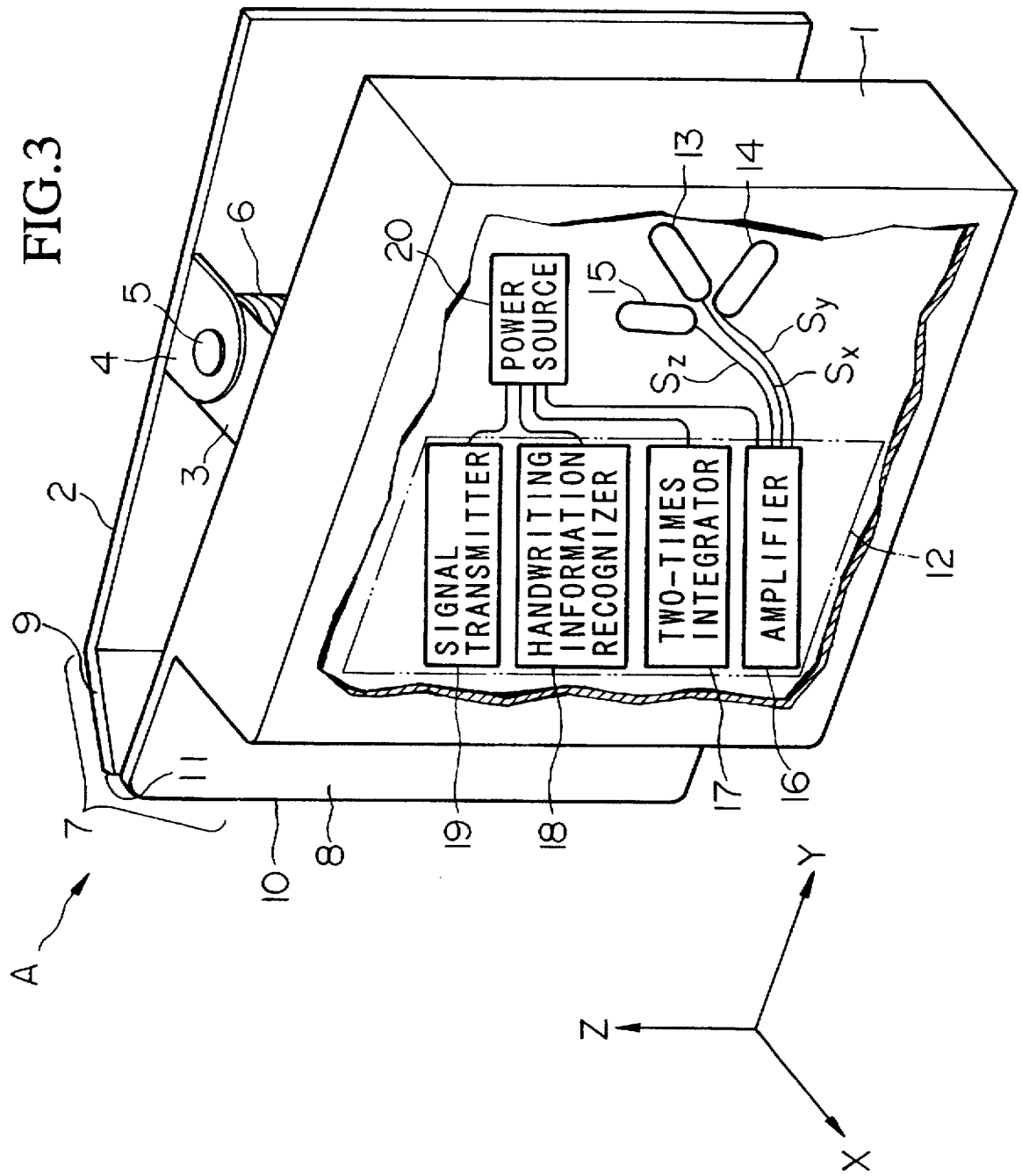
FIG. 3 is a partially cut-away perspective view showing the internal structure of the detecting apparatus of FIG. 1.

FIG. 1 is a perspective view of the apparatus holding a pencil, FIG. 2 is a perspective view of the apparatus being grasped by fingers, and FIG. 3 is a partially cut-away perspective view showing the internal structure of the apparatus.

In the figures, reference symbol A indicates the handwriting information detecting apparatus of the present embodiment, reference numeral 1 indicates the body of the apparatus functioning as a writing tool holder, reference symbol α indicates a pencil as a suitable example of a writing tool, reference symbol β indicates a hand, and reference symbols βa and βb indicate the index finger and the thumb of the hand, respectively. Reference numeral 2 indicates a plate, reference numerals 3 and 4 indicate supporting pieces, reference numeral 5 indicates a binding pin, reference numeral 6 indicates a coil spring, reference numeral 7 indicates a writing tool clamping part, reference numeral 8 indicates an L-step part, reference numeral 9 indicates an inclined part, reference numerals 10 and 11 indicate ends of the L-step part 8 and the inclined part 9 respectively, reference numeral 12 indicates a handwriting information recognition circuit, reference numerals 13, 14, and 15 indicate X-, Y-, and Z-axis acceleration sensors respectively, the axes corresponding to those of the three dimensional rectangular coordinates, and reference numeral 20 indicates a power source.

The handwriting information recognition circuit 12 includes an amplifier 16 for amplifying and outputting each signal output from each of the X-, Y-, and Z-axis acceleration sensors, a two-times integrator 17 for twice integrating each amplified signal output from each of X- and Y-axis acceleration sensors and outputting the integrated signals and the amplified signal of the Z-axis acceleration sensor, a handwriting information recognizer 18 for recognizing handwriting information by detecting the motions of the writing tool based on the outputs from the two-times integrator 17, and a signal transmitter 19 for outputting the handwriting information which was recognized by the handwriting information recognizer 18 to the outside of the apparatus.

In the apparatus A, supporting pieces 3 and 4 are combined by binding pin 5 and elastically urged by coil spring 6 so as to enable ends 10 and 11 to elastically open and close in a way similar to a clothes-pin. That is, as shown in FIG. 1, pencil α is clamped and held by writing tool clamping part 7 like the case of a clothes-pin.

As a writing tool to be clamped by writing tool clamping part 7, a ball-point pen, a mechanical pencil, a fountain pen, a writing brush, a marker pen, a water-paint pen, a paintbrush, and the like are also possible to choose in place of pencil α.

Z-axis acceleration sensor 15 is arranged in a manner such that the direction of its axis is approximately made parallel to the line of the end 10 of the L-step part 8, that is, made approximately parallel to the direction of up and down motions of the writing tool grasped by the user. On the other hand, X- and Y-axis acceleration sensors 13 and 14 are arranged in a manner such that the direction of each axis is perpendicular to the axial direction of the Z-axis acceleration sensor 15 and that the axial directions of the X- and Y-axis acceleration sensors are also perpendicular to each other. These three sensors are built in the body 1.

When a user uses the writing tool (here, pencil α) held by apparatus A, body 1 is grasped by the user in a manner of putting the body between his fingers, by applying his thumb βb to inclined part 9, while applying his index finger βa to L-step part 8, as shown in FIG. 2. According to this, the location (direction) of apparatus A while being grasped is always approximately fixed; thus, the axial directions of X-, Y-, and Z-axis acceleration sensors which are built in the body 1 are aligned in pre-determined directions approximately.

Power source 20 may have ordinary dry cells, or lithium, Ni—Cd, or air cells. Solar cells, which are attached on the body 1, may also be used.

Method Example

Hereinbelow, a method example for detecting handwriting information of the present invention, which is applied to the present apparatus, will be explained.

When the user writes a character and so on with pencil α which is held by apparatus A, the body which is combined with the pencil α moves together with the pencil.

First, the up and down motions of pencil a are detected by using signal $S_z$ output from Z-axis acceleration sensor 15. Here, the following definitions are provided for explanation. The down motion of the writing tool indicates a motion of lowering the writing tool so as its point touches the paper, while the up motion of the writing tool indicates a motion of raising the writing tool so as to remove its point from the paper. Additionally, a "stroke" indicates a motion which occurs between a down motion and the following up motion of the writing tool.

In this example, two thresholds for the down and up motions are provided for the level of signal $S_z$, and if the signal level exceeds the threshold for the up motion, it is judged that the up motion has occurred, while if the signal level exceeds the threshold for the down motion, it is judged that the down motion has occurred. Here, according to which directions of the up and down motions the positive direction of Z-axis acceleration sensor 15 corresponds to, one of the thresholds for the down and up motions is positive, and the other is negative. In each motion, the absolute value of the signal varies in a manner such that the value exceeds the corresponding threshold. In addition, the absolute values of both thresholds may be different or may be the same. According to this method, it is possible to detect each remarkable point of the motions of the writing tool, such as a starting point of writing a character or a figure, a rest, a restarting point of the writing, the end point of writing a character or a figure, and the like.

Figure 4:
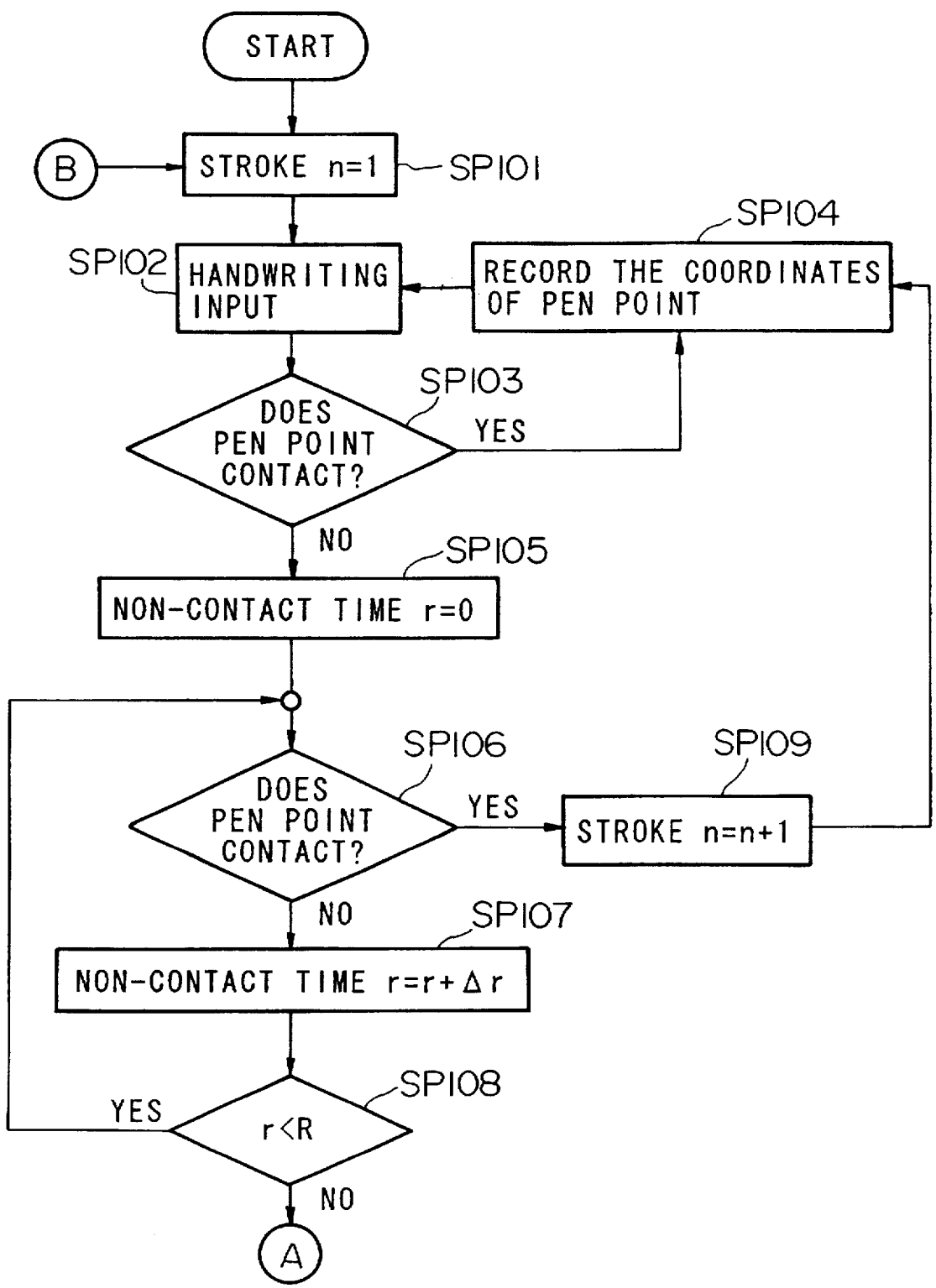
FIG. 4 is a flow chart explaining the input process for the writing points of the character recognition method in the first embodiment of the present invention.
Figure 5:
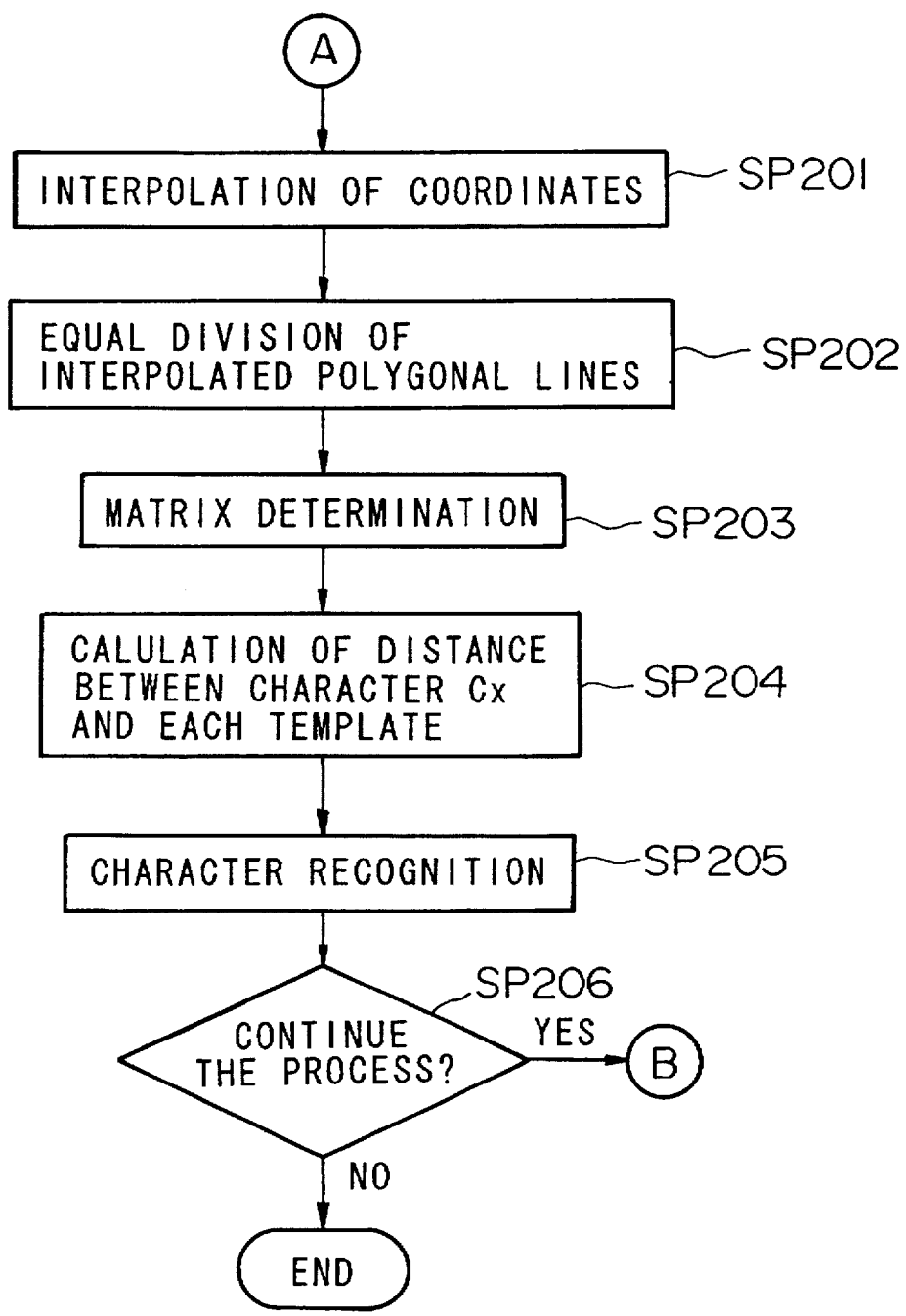
FIG. 5 is a flow chart explaining the recognition process of the character recognition method.

Next, motions of the writing tool on the paper (i.e., on the surface for writing) are detected by using signals $S_x$, $S_y$ output from X- and Y-axis acceleration sensors 13 and 14. If time variations of acceleration of X- and Y-axes indicated by these signals are twice integrated and the results (that is, displacement data for the X- and Y-directions) are represented in the X-Y coordinate plane, the character or figure which was written by the user can be restored. A concrete example of character recognition using such a method will be explained below in connection with a general pen, referring to the flow charts of FIGS. 4 and 5. Here, FIG. 4 shows the input process for writing points (i.e., points on the stroke), and FIG. 5 shows the recognition process based on the inputted writing points. Each process is performed by handwriting information recognizer 18.

The input process commences along with the initial assignment of stroke number n=1 (see step SP101), and the handwriting input of the nth stroke of a character is conducted using the apparatus A (see step SP102). This character is designated as Cx.

Next, it is judged whether or not the point of the pen is in contact with an object for writing (see step SP103). If judged "yes", the coordinates of the pen point are recorded for the first writing point of the sequence information of the nth stroke (see step SP104). These coordinates are determined according to the displacement data output from two-times integrator 17.

On the other hand, If judged "no" in step SP103, non-contact time r with regard to the pen and the object for writing (that is, the time in which the pen does not touch with the object) is measured (see steps SP105–SP107). Then, it is judged whether or not the non-contact time r is smaller than a preset value R (see step SP108), and when the non-contact time r reaches or exceeds this preset value R, it is recognized that handwriting input of all strokes of the character Cx has been completed, and the recognition process from step SP201 commences.

On the other hand, in the case when the pen point comes back into contact with the paper while the non-contact time r does not reach preset value R, it is recognized that handwriting input of the (n+1)th stroke has commenced, and input processing continues (see steps SP108, SP106, and SP109).

Figure 6A:
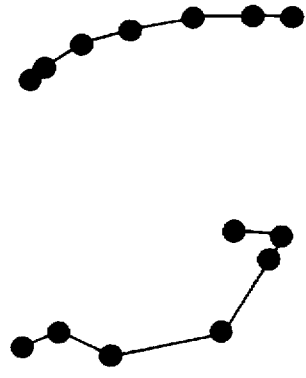
FIG. 6A shows the real shape of a Japanese hiragana "i" as an example of a handwritten character.
Figure 6B:
FIG. 6B shows each writing point.

Here, it is assumed that the user wrote a Japanese hiragana "i" (here, represented in Romaji), whose real shape is shown in FIG. 6A. FIG. 6B shows writing points whose coordinates were recorded by the above input process.

Figure 6C:
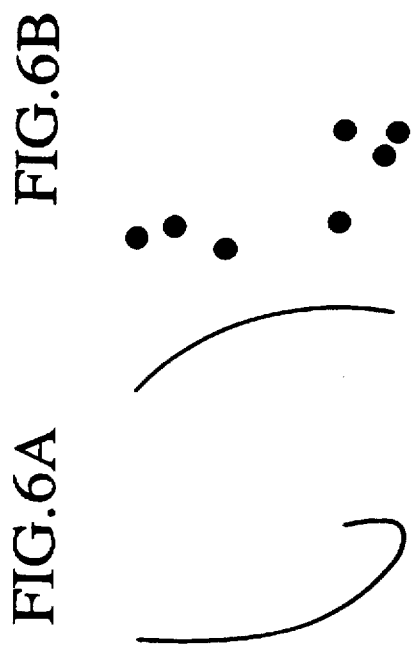
FIG. 6C shows interpolation of the writing points.

In step SP201 in FIG. 5, the neighboring points of each respective stroke recorded above are connected using straight lines to interpolate each interval between the stroke points. This state is shown in FIG. 6C.

Subsequently, such polygonal line obtained by such linkage for each stroke is equally divided into k (k≧1) polygonal (or straight) lines, and numbers are assigned to each division point, i.e., 1, 2, ..., k+1 (1 is the stroke origin; k+1 is the end of the stroke) according to the time sequence of the points (see step SP202). The result in a case of k=4 for FIG. 6C is shown in FIG. 6D.

Next, taking any two strokes $n_1$ and $n_2$ from all strokes in turn, a (k+1)N row×k·N column (where N is the number of strokes) matrix P consisting of elements is calculated, wherein the element of row $\{(k+1)(n_1-1)+i\}$ and column $\{k(n_2-1)+j\}$ comprises an angle $\Omega$ formed by means of a straight line joining division point i of stroke $n_1$ and division point j of stroke $n_2$, and a straight line joining division point i of stroke $n_1$ and division point j+1 of stroke $n_2$ (see step SP203).

Figure 6D:
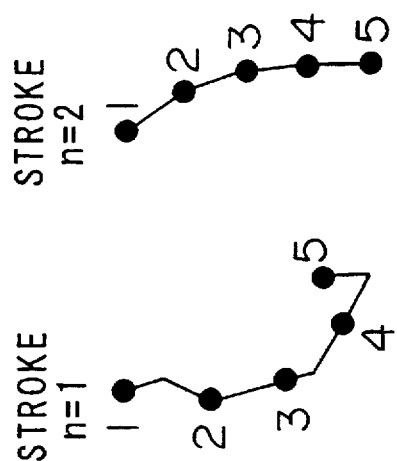
FIG. 6D shows the division of each stroke.
Figure 6E:
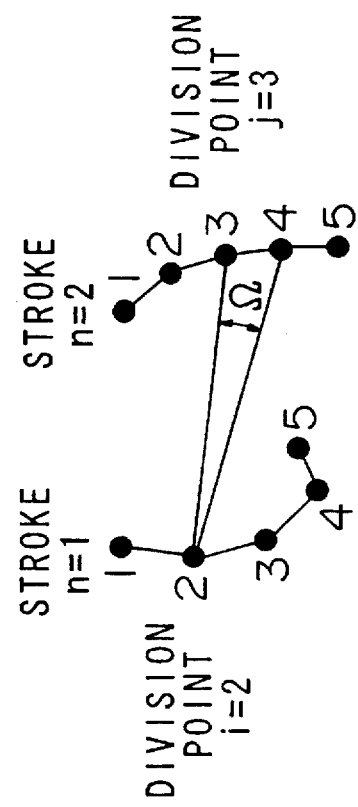
FIG. 6E is for the purpose of explaining the determination of matrix elements.

In FIG. 6D, N=2, k=4, $n_1$=1, and $n_2$=2; thus, a 10(row)×8 (column) matrix P consisting of elements is calculated, wherein the element of the row i and column (4+j) comprises the angle $\Omega$ formed by means of a straight line joining division point i (i=1~5) of stroke $n_1$ and division point j (j=1~4) of stroke $n_2$, and a straight line joining division point i of stroke $n_1$ and division point j+1 of stroke $n_2$. The angle $\Omega$ shown in FIG. 6E comprises i=2 and j=3; thus the angle is determined as the element of row 2 and column 7 of matrix P.

In handwriting information recognizer 18 of apparatus A, similar matrices corresponding to each character are stored, and they will be referred to as templates.

The distance di (i=1, ..., M) between the inputted handwritten character Cx and M templates Qi (i=1, ..., M)

corresponding to the respective characters possessing the same number of strokes is calculated as the sum of the squares of each element of a matrix which is obtained by "matrix P–matrix Qi (see step SP204). Here, this sum of the square is calculated by means of either taking the sum of the squares of all elements of "matrix P–matrix Qi", or taking the sum of the squares of a specific portion of the above matrix (e.g., the portion of elements calculated from the straight line connecting a division point of stroke n and a division point of stroke n+1).

The character Cz corresponding to the template Qz with the smallest distance dz is then selected as the recognition result (see step SP205). If other characters for recognition exist, the procedure returns to step SP101, and the above-described steps are repeated (see step SP206).

It is also possible to recognize the handwriting information according to velocity data which are obtained by once integrating the acceleration data, instead of twice integrating those data. In this case, in step SP104 of the input procedure shown in FIG. 4, components $v_x$ and $v_y$ of the velocity v of the pen point moving along each stroke may be input as coordinate data instead of coordinates of the writing point. In this case, templates corresponding to the velocity data must be previously stored.

It is also possible to recognize the handwriting information according to acceleration data themselves. In this case, suitable templates are previously stored, and components $a_x$ and $a_y$ of the acceleration a of the pen point moving along each stroke are input as coordinate data.

Combination of two or more of these three kinds of methods is also possible for recognizing the handwriting information.

The recognized character information may be transmitted out from signal transmitter 19 in the form of character codes via a wireless or infrared system and be received by any external and ordinary computer which has a receiver for the information. The signal transmission from signal transmitter 19 may be performed via a wired system.

On the other hand, the output from two-times integrator 17, that is, the result of the two-times integration, which is the locus of a character or figure itself, may be directly output from the signal transmitter 19 without recognizing the character or figure based on the above-mentioned writing points.

Variation of the Apparatus

Figure 7:
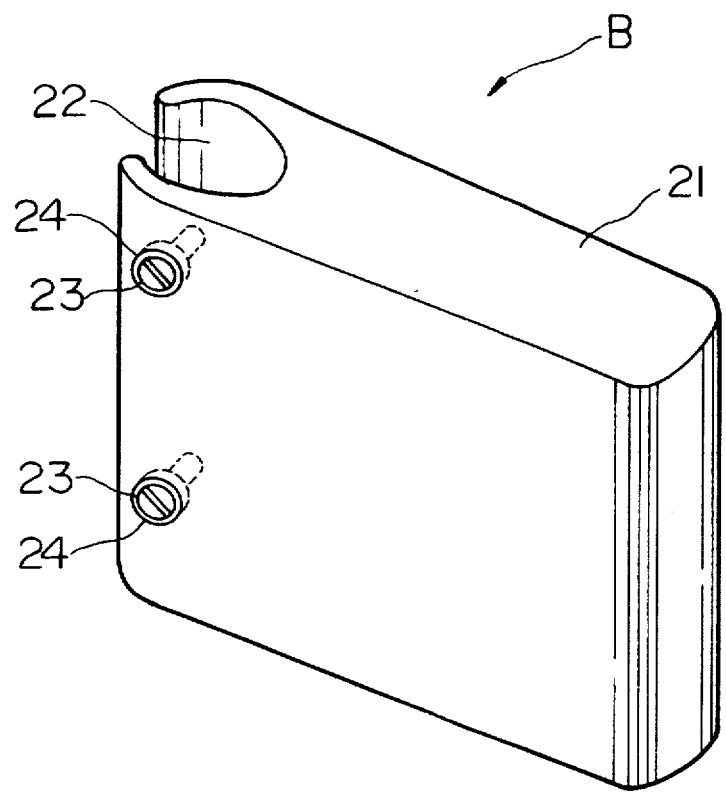
FIG. 7 is a perspective view of the handwriting information detecting apparatus as a variation of the first embodiment.

FIG. 7 is a perspective view of handwriting information detecting apparatus B as a variation of apparatus A in FIG. 1. In the figure, reference numeral 21 indicates a body of the apparatus, reference numeral 22 indicates an indentation, provided at an end of the body 21, for holding a writing tool, reference numeral 23 indicates screws for pressing and fixing the writing tool which is inserted in the indentation 22 by their points, via tapped holes 24 with spot facing which are provided outside body 21.

Therefore, apparatus B detachably holds any writing tool by using indentation 22 of body 21 and screws 23, not by using elastic force of the coil spring as the case of apparatus A.

In the body 21, the same acceleration sensors and the handwriting information recognition circuit as those of the apparatus A shown in FIG. 3 are internally provided and the procedures explained in the above "Method Example" are performed for recognizing the handwriting information.

Second Embodiment

In the method of the first embodiment, there occurs a problem that if sufficient displacement or impact in the down direction does not occur during the down motion, the motion cannot be properly detected. In addition, in the up motion of the writing tool, there occurs further smaller impact in comparison with the case of the down motion; thus, the detection is harder. The second embodiment for improving this point will be shown below.

Example of the Apparatus

Figure 8:
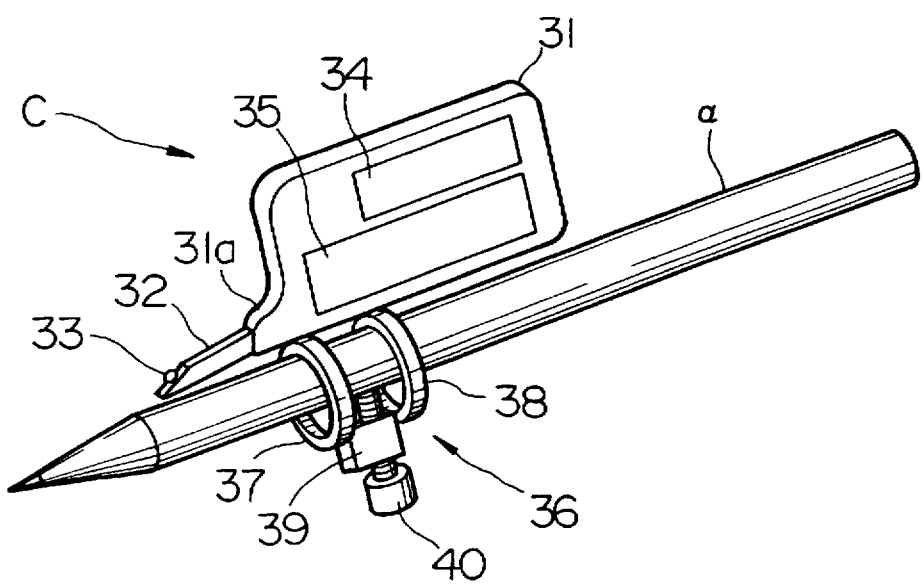
FIG. 8 is a perspective view of the handwriting information detecting apparatus of the second embodiment of the present invention holding a pencil.
Figure 9:
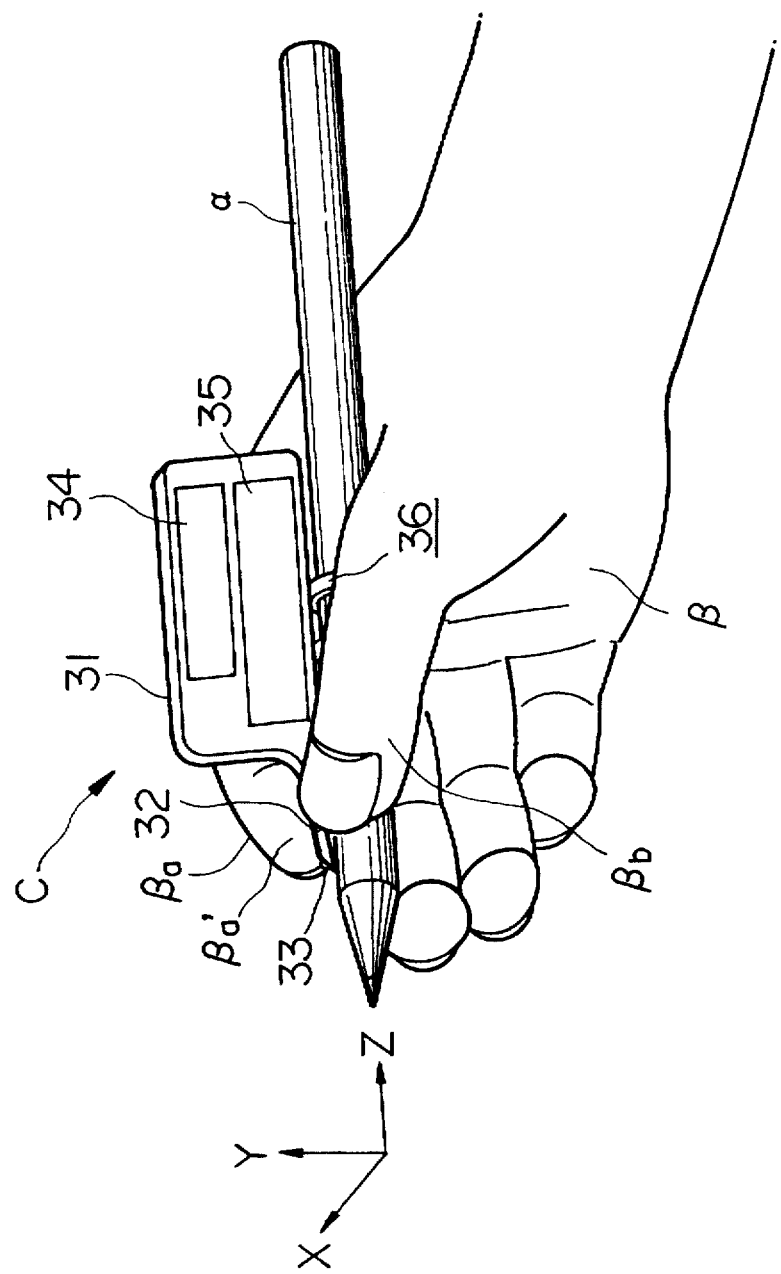
FIG. 9 is a perspective view of the detecting apparatus of FIG. 8 holding a pencil and being grasped by a user.
Figure 10:
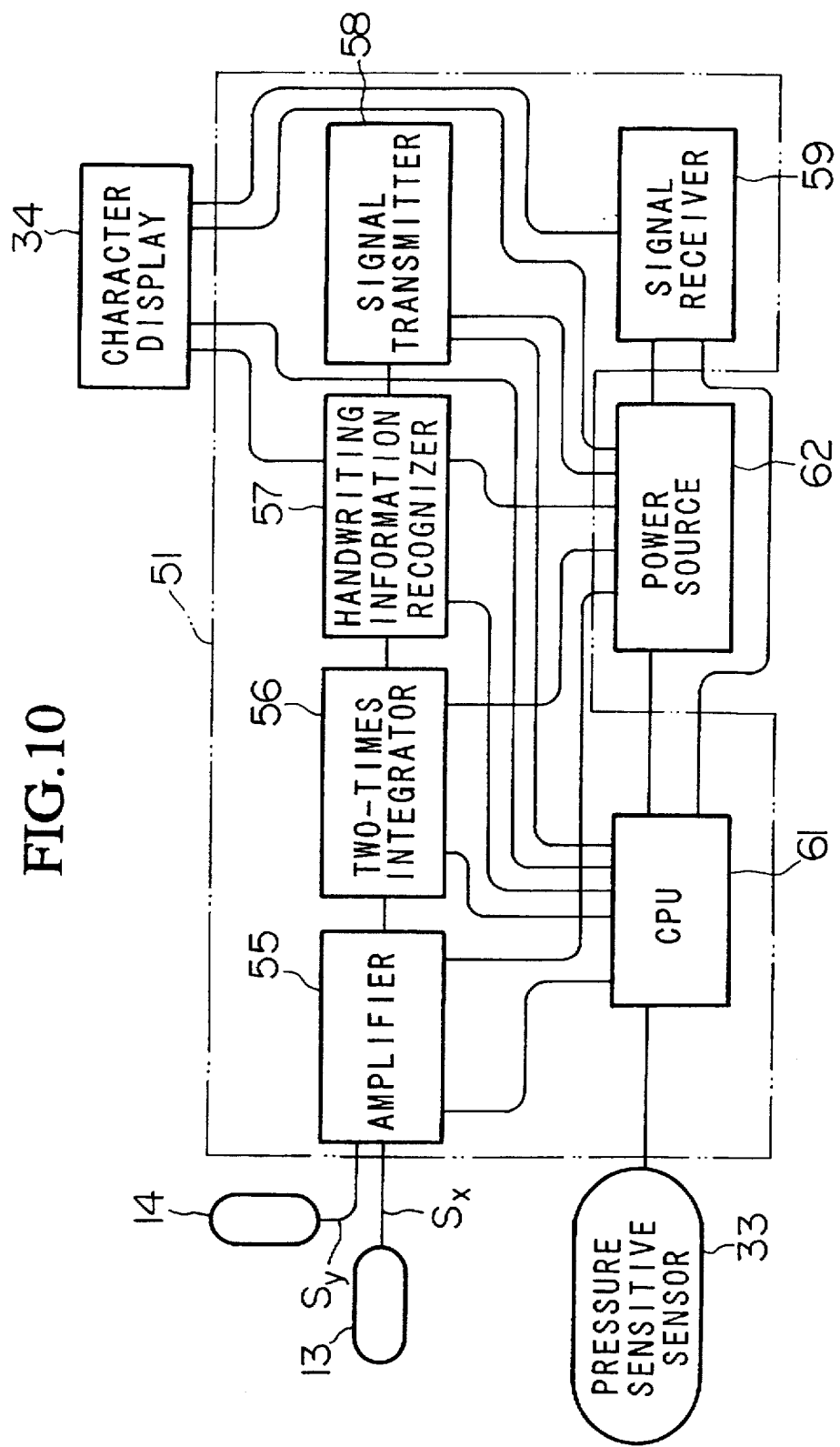
FIG. 10 is a block diagram showing the handwriting recognition and display circuit of the detecting apparatus of FIG. 8.
Figure 11:
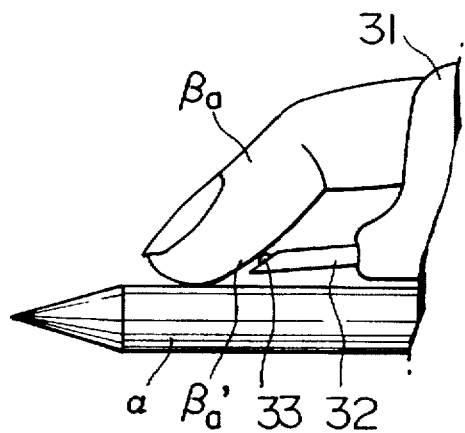
FIG. 11 is for the purpose of explaining a positional relationship between a pressure sensitive sensor fixed on an elastic beam which is projected from the body of the apparatus of FIG. 8, the index finger of a user, and a pencil.

FIG. 8 is a perspective view of the handwriting information detecting apparatus of this embodiment holding a pencil, FIG. 9 is a perspective view of the apparatus being grasped by fingers, FIG. 10 is a block diagram showing the handwriting recognition and display circuit of the apparatus, and FIG. 11 is for the purpose of explaining a positional relationship between a pressure sensitive sensor fixed on a beam which is projected from the body of the apparatus, the index finger of a user, and the pencil. In these figures, parts which are identical to those shown in FIGS. 1–3 are given identical reference numbers and an explanation thereof will be omitted here.

In the FIGS. 8–11, reference symbol C indicates the handwriting information detecting apparatus of the present embodiment, reference symbol $\beta a'$ indicates the finger cushion of the tip of index finger $\beta a$, reference numeral 31 indicates the body of the apparatus forming a curved step part 31a, the body functioning as a writing tool holder, and reference numeral 32 indicates an elastic beam, made of plastics and the like, which is projected from the curved step part 31a of the body 31. The finger cushion $\beta a'$ of the index finger touches the end of the beam when the user grasps pencil α. Reference numeral 33 indicates a pressure sensitive sensor, fixed on the end of the elastic beam 32, for detecting the level of the pressure caused by finger cushion $\beta a'$.

Reference numeral 34 indicates a character display, and a liquid crystal display is used in this embodiment. Reference numeral 36 indicates a writing tool holding part comprising a pair of rings 37 and 38 for inserting and holding the writing tool, a block nut 39 which is fixed between the lower ends of these rings, and a bolt 40 for fixing the writing tool. In the case of apparatus C, pencil α is inserted into rings 37 and 38 to a suitable position, and by fastening bolt 40, the pencil α is fixed to the apparatus C.

Next, reference numeral 51 indicates a handwriting recognition and display circuit which is built in the body 31. Reference numeral 55 indicates an amplifier for amplifying and outputting each signal output from each of X- and Y-axis acceleration sensors, reference numeral 56 indicates a two-times integrator for twice integrating each amplified signal output from each of X- and Y-axis acceleration sensors and outputting the integrated signals, reference numeral 57 indicates a handwriting information recognizer for recognizing handwriting information by detecting motions of the writing tool based on the outputs from the two-times integrator 56, reference numeral 58 indicates a signal transmitter for outputting the handwriting information which was recognized by the handwriting information recognizer 57, and reference numeral 59 indicates a signal receiver which can receive signals transmitted from any external device.

Reference numeral 61 indicates a CPU (central processing unit), connected to pressure sensitive sensor 33, for totally controlling the whole system including amplifier 55, two-times integrator 56, handwriting information recognizer 57, signal transmitter 58, and signal receiver 59, and reference numeral 62 indicates a power source, using solar cells 35 which are mounted on the body, for supplying drive current to the whole system. Power source 62 may have ordinary dry cells, or lithium, Ni—Cd, or air cells in the body. An external power source may also be used via an electric cable.

When a user uses the writing tool held by apparatus C, the lower part of body 31 is grasped by the user in a manner of putting the lower part and the writing tool holding part 36 between his thumb βb and index finger βa, as shown in FIG. 9. Also in this case, the position of apparatus C while being grasped is always approximately fixed; thus, the axial directions of X- and Y-axis acceleration sensors 13 and 14 which are built in the body 31 are aligned in pre-determined directions approximately.

Additionally, at this time, the positional relationship between the index finger βa of the user, elastic beam 32, pressure sensitive sensor 33, and pencil α is such as shown in FIG. 8; thus, finger cushion βa' of the index finger βa touches with the pressure sensitive sensor 33.

Method Example

Hereinbelow, a method example for detecting the handwriting information of the present invention, which is applied to the present apparatus, will be explained.

When the user writes characters by pencil α on a writing surface like a paper on the desk, in the "down state" in which the point of pencil α contacts with the paper, considerable force acts on finger cushion βa' of index finger βa which contacts with pencil α. On the other hand, in the "up state" in which the point of pencil α does not touch with the paper, the force which acts on the finger cushion βa' is smaller than that of the down state.

Accordingly, the up and down motions of pencil α to the paper etc. can be detected by processing a signal output from pressure sensitive sensor 33 mounted on elastic beam 32 based on thresholds, as the case of the first embodiment. That is to say, if the signal level exceeds a threshold for the down motion, that is, if the pressure exceeds a level, it is judged that the down motion has occurred, while if the signal level goes below a threshold for the up motion, that is, if the pressure goes below a level, it is judged that the up motion has occurred. According to this, it is possible to detect each remarkable point of the motions of the writing tool, such as a starting point of writing a character or a figure, the end point of writing a character or a figure, and the like. Here, if the output signal from the pressure sensitive sensor 33 has a negative characteristic, the judgment may be conducted such that if the signal exceeds a threshold in the negative direction, the motion is judged as a down motion.

Next, motions on the surface for writing are detected by using signals $S_X$, $S_Y$ output from X- and Y-axis acceleration sensors 13 and 14. The recognition of handwriting information based on these signals are performed by handwriting information recognizer 57 and any one of the following four methods can be adopted, as the case of the first embodiment.

(1) Using the twice integrated data of acceleration of X- and Y-directions (2) Using the once integrated data of acceleration of X- and Y-directions (3) Using the acceleration data of X- and Y-directions themselves (4) Using a combination of two or more of the above three kinds of methods The recognized character information may be transmitted out from signal transmitter 59 in the form of character codes via a wireless or infrared system and be received by any external and ordinary computer which has a receiver for the information. At this time, the recognized result of the character written by the user is displayed on character display (liquid crystal display) 34; thus, the user can confirm the result.

Not only to the character input, the present apparatus and method may be applied to an interactive pager. In this case, the message transmitted via a wireless or infrared system from a communication partner may be received by signal receiver 59, and it may also be possible to read the message on character display 34.

Experimental Example

Figure 12:
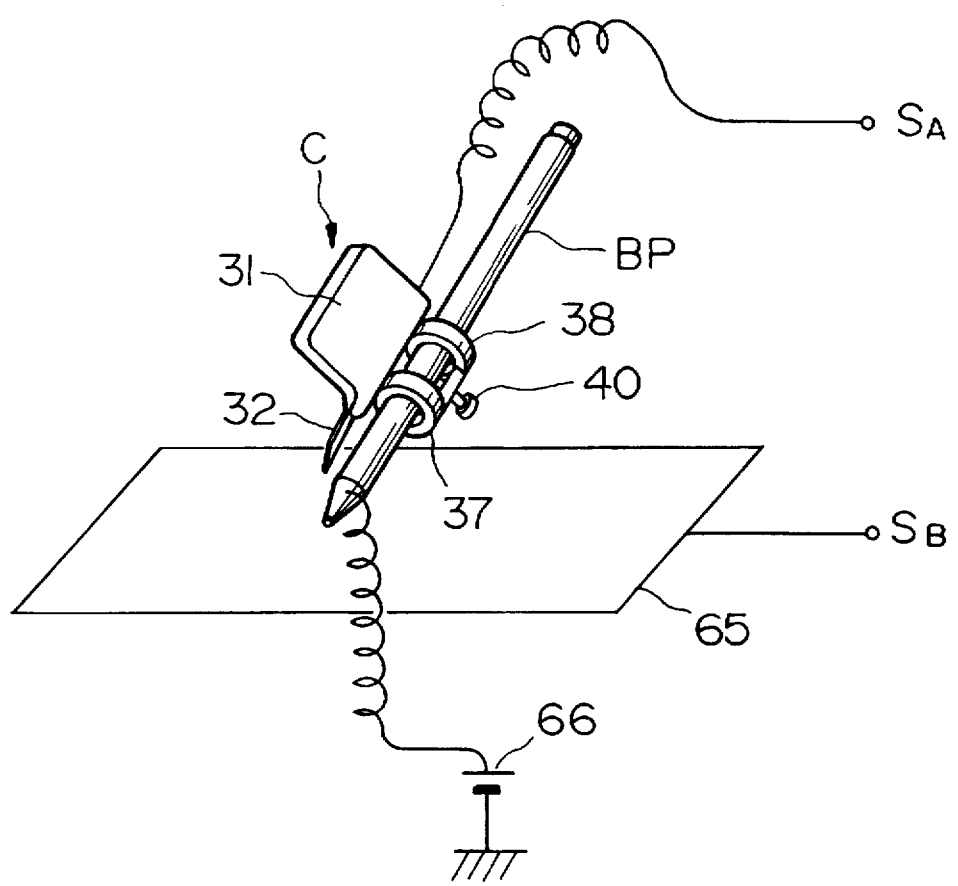
FIG. 12 shows an arrangement for the experiment used to examine condition of the detection of the detecting apparatus of FIG. 8.

Now, an experiment to examine condition of the detection of the apparatus and its results will be explained below. In the experiment, as shown in FIG. 12, ball-point pen BP was held by the handwriting information detecting apparatus C and a testee was instructed to perform a writing action on a metal plate 65 instead of paper.

The pen point of ball-point pen PB is made of metal; thus, while the pen point was in contact with the metal plate 65 (that is, in the down state of the pen), voltage of battery 66 was detected as signal $S_B$. On the other hand, the output from pressure sensitive sensor 33 of apparatus C was detected as signal $S_A$.

FIG. 13 shows variations of both signals obtained from one stroke performed by a testee. In the graph of FIG. 13, the horizontal axis indicates "time", while the vertical axis indicates "voltage". Here, signal $S_A$ has a negative characteristic.

According to FIG. 13, it is understood that a pen-down motion was performed at about time $t_1$, and a pen-up motion was performed at about time $t_2$. Here, the outputs from pressure sensitive sensor 33 very much corresponds to the actual pen-motion which is represented by signal $S_B$. For other testees, similar results of satisfactory correspondence were obtained.

Therefore, it is understood that, for example, the following judgment can be adopted: if signal $S_A$, the output from pressure sensitive sensor 33, goes below −0.5 V, the motion is "pen-down", while if signal $S_A$ exceeds −0.5 V, the motion is "pen-up".

First Variation of the Apparatus

Figure 14:
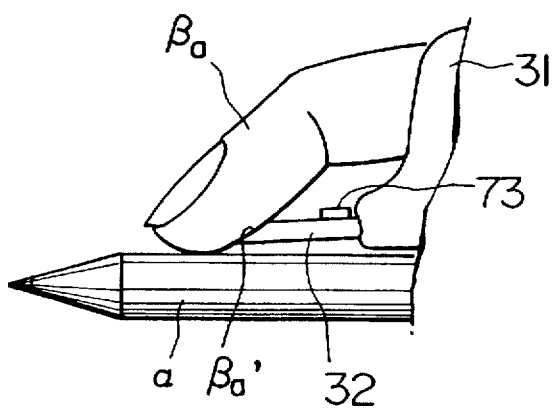
FIG. 14 shows a variation of the second embodiment, and explains a positional relationship between a strain gauge fixed on an elastic beam, the index finger of a user, and a pencil.

FIG. 14 shows a variation of apparatus C in FIG. 8, and explains a positional relationship between a strain gauge fixed on the elastic beam, the index finger of a user, and the pencil. In the figure, reference numeral 73 indicates a strain gauge fixed on a part near the root of elastic beam 32. That is, in this variation, the strain gauge 73 is provided as a sensor for judging the up and down motions of pencil α, instead of pressure sensitive sensor 33 in FIG. 8. Other arrangements of the variation are the same as those of apparatus C.

As described above, Much more force acts on finger cushion βa' of index finger βa which contacts with pencil α during the down state of pencil α than the force acting during the up state of the pencil; thus, elastic beam 32 bends and is strained. The quantity of the strain is measured by the strain gauge 73. In the up state in which the point of pencil α does not touch with the writing surface, the strain on elastic beam 32 becomes small.

Therefore, motions of pencil α can be detected by performing a similar threshold process to the above-explained examples for the output signal from strain gauge 73.

Second Variation of the Apparatus

Figure 15:
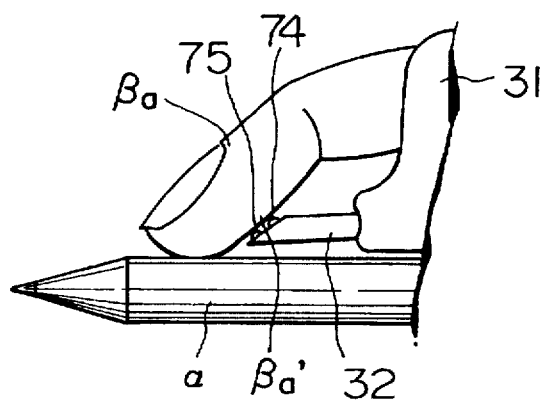
FIG. 15 shows another variation of the second embodiment, and explains a positional relationship between a pair of a light-emitting element and a light-receiving element fixed on an elastic beam, the index finger of a user, and a pencil.

FIG. 15 shows another variation of the apparatus C, and explains a positional relationship between a pair of a light-emitting element and a light-receiving element fixed on the elastic beam, the index finger of a user, and the pencil. In the figure, reference numerals 74 and 75 indicate a LED (light emitting diode) and a phototransistor respectively, as suitable examples of a pair of a light-emitting element and a light-receiving element. They are fixed on the end part of elastic beam 32. That is, in this variation, LED 74 and phototransistor 75 are provided instead of pressure sensitive sensor 33, and other arrangements of the variation are the same as those of apparatus C.

In this case, near infrared light which is irradiated by LED 74 is scattered inside the finger, and a part of the scattered light is detected by phototransistor 75. The variation of the level of the detected light corresponds to the photoelectric pulse wave. The photoelectric pulse wave is explained such that the variation of blood pressure according to the beat of the heart is detected as a pulsation of the blood vessel. Here, if the differential pressure inside and outside the blood vessel of the artery decreases, the compliance of the artery increases; thus, the amplitude of the signal of the photoelectric pulse wave also increases (Hiraiwa et al., "Physiological Stress Change by Means of Noninvasive Measurement of Arterial Pressure and Mechanical Properties", the Proceedings of 3rd Symposium on Human Interface, pp. 61–66, the Society of Instrument and Control Engineers, 1987).

Therefore, when the point of pencil a contacts with the surface for writing, LED 74 and phototransistor 75 presses into the finger cushion βa' of the index finger βa of the user, and the pressure which is added to the finger cushion βa' increases; thus, the differential pressure inside and outside the blood vessel in the finger cushion βa' decreases. That is, the amplitude of the signal of the photoelectric pulse wave, which has been photo-electrically converted by phototransistor 75 from near infrared light which had passed through the skin, increases. On the other hand, when the point of pencil α does not contact with the surface for writing, the pressure added to the finger cushion βa' of the index finger βa decreases; thus, the differential pressure inside and outside the blood vessel in the finger cushion βa' increases. That is, the amplitude of the signal of the photoelectric pulse wave decreases.

Accordingly, also in this case, by performing a similar threshold process to the above-explained examples for the amplitude of the photoelectric pulse wave signal, the judgment can be performed such that if the amplitude exceeds a threshold, the down motion of pencil α has occurred, while if the amplitude goes below a threshold, the up motion of pencil α has occurred.

As explained above, in this embodiment, the variation of the pressure acting on the finger cushion of the index finger of the user during the up or down motion of the writing tool is detected by an elastic beam and various kinds of sensors; thus, there is an advantage that the up and down motions of any writing tool can be certainly and easily detected.

Third Embodiment

Similar to the above second embodiment, an example of the handwriting information detecting apparatus and method in which the up and down motions of the writing tool are detected without providing an acceleration sensor for the Z-direction will be proposed below.

Example of the Apparatus

Figure 16:
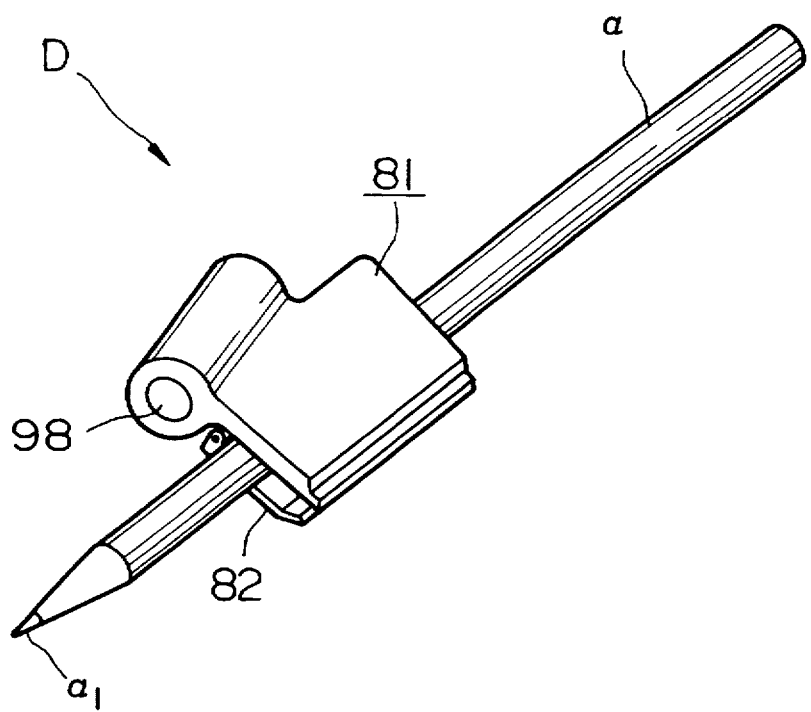
FIG. 16 is a perspective view of the handwriting information detecting apparatus of the third embodiment of the present invention holding a pencil.
Figure 17:
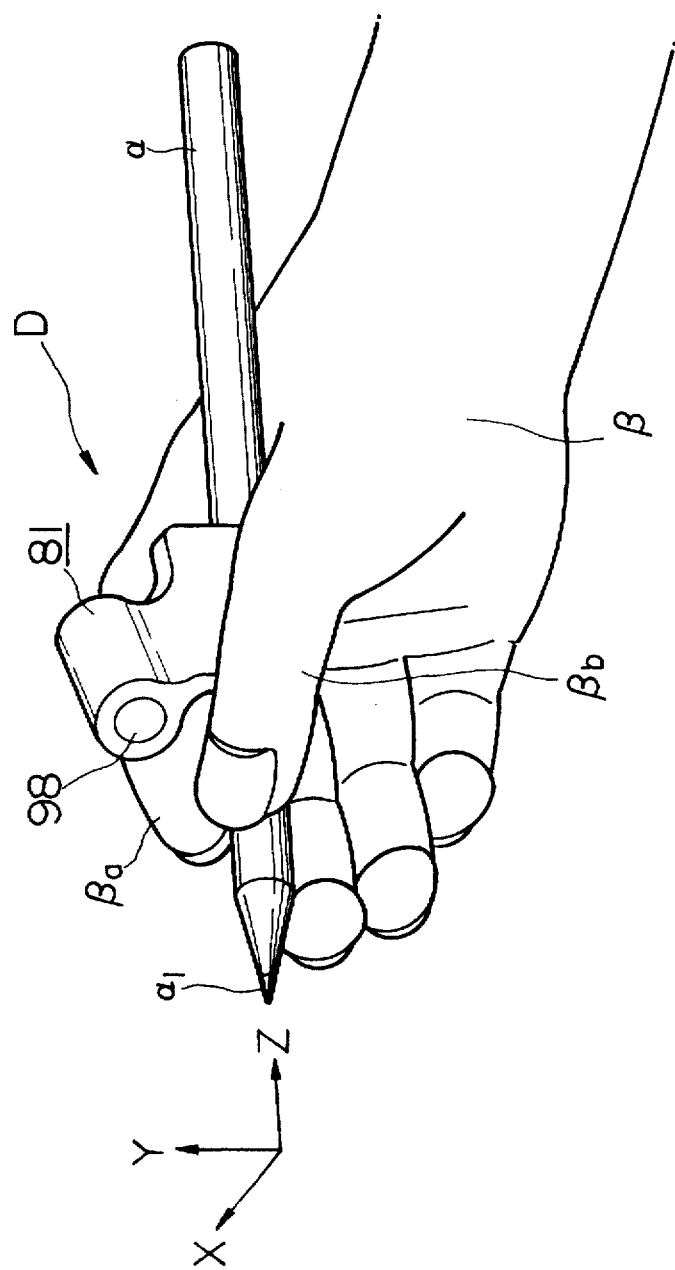
FIG. 17 is a perspective view of the detecting apparatus of FIG. 16 holding a pencil and being grasped by a user.
Figure 18:
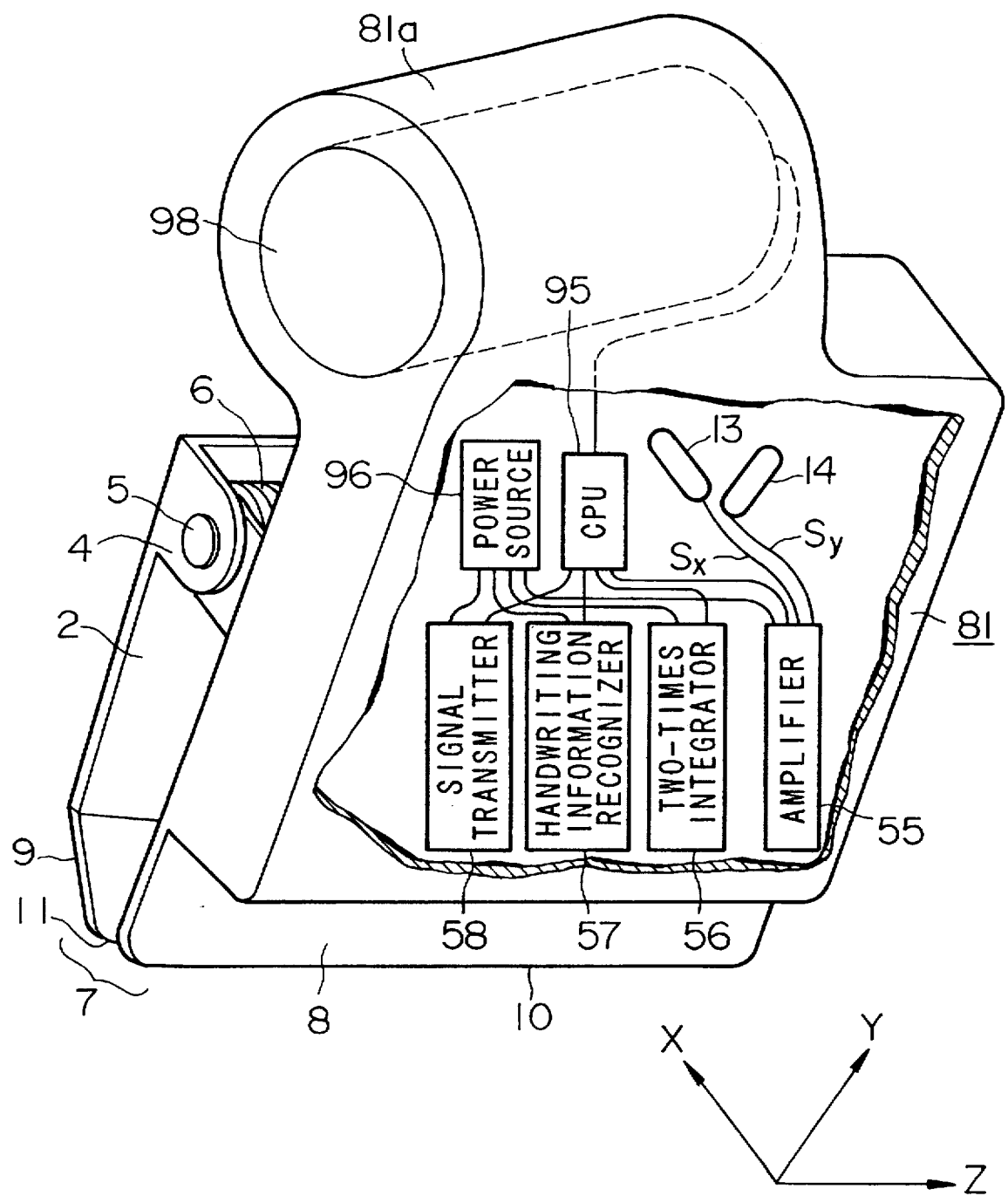
FIG. 18 is a partially cut-away perspective view showing the internal structure of the detecting apparatus of FIG. 16.

FIG. 16 is a perspective view of the handwriting information detecting apparatus of this embodiment holding a pencil. FIG. 17 is a perspective view of the apparatus being grasped by fingers, and FIG. 18 is a partially cut-away perspective view showing the internal structure of the apparatus. In these figures, parts which are identical to those shown in FIGS. 1~3 and FIGS. 8~10 are given identical reference numbers and an explanation thereof will be omitted here.

In the FIGS. 16~18, reference symbol D indicates the handwriting information detecting apparatus of the present embodiment, reference numeral 81 indicates the body of the apparatus functioning as a writing tool holder, and reference numeral 81a indicates a CCD (charge coupled device) container which is formed as a part of the body 81. Reference numeral 98 indicates a CCD monitor camera as a suitable example of a photographic monitor means and is housed in the CCD container 81a. Reference numeral 95 indicates a CPU, connected to CCD monitor camera 98, for totally controlling the whole system including amplifier 55, two-times integrator 56, handwriting information recognizer 57, and signal transmitter 58, and reference numeral 96 indicates a power source for supplying drive current to the whole system. The apparatus D has the same mechanism as that of apparatus A. As shown in FIG. 16, pencil α is clamped and held by writing tool clamping part 7. Here, a suitable holding position is chosen for monitoring images of the neighborhood of the point of pencil α by CCD monitor camera 98.

The manner of using pencil α by a user is similar to that of apparatus A, and the direction of apparatus D when the user grasps pencil α is also always approximately fixed; thus, the axial directions of X- and Y-axis acceleration sensors 13 and 14 are aligned in pre-determined directions approximately.

Method Example

Figure 22:
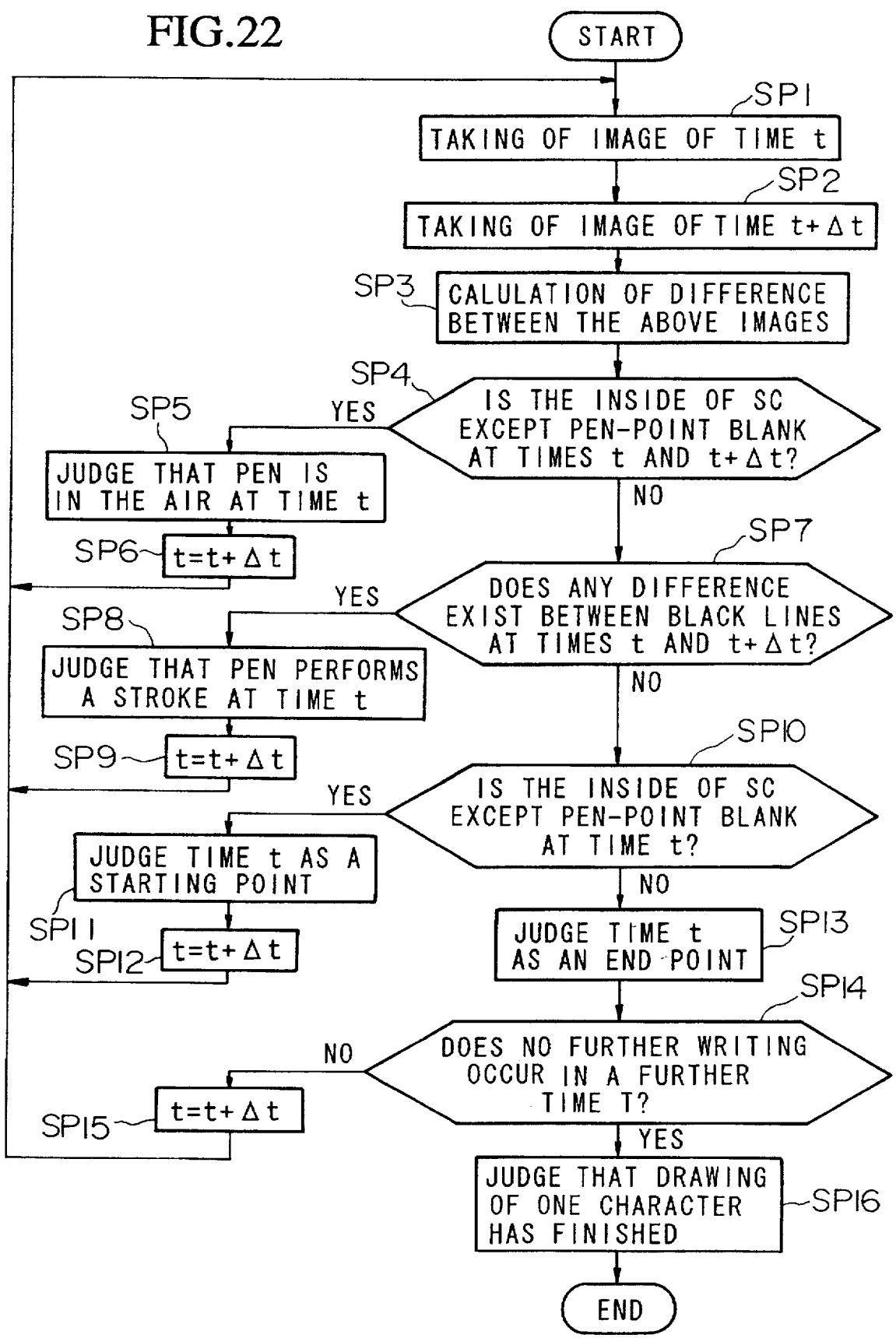
FIG. 22 is a flow chart explaining the process for detecting motions of a pen by using the monitor images.

Hereinbelow, a method example for detecting the handwriting information of the present invention, which is applied to the above apparatus, will be explained. FIG. 19 is for the purpose of explaining the starting and end points of the motion of one stroke during writing a character. FIGS. 20A and 20B are for the purpose of explaining monitor images of the area around a starting point, FIG. 21 is for the purpose of explaining a monitor image of the area around an end point, and FIG. 22 is a flow chart explaining the process for detecting motions of a pen by using the monitor images.

Hereinafter, it is assumed that a right-handed user writes a character or a figure by using an arbitrary pen held by the present apparatus, and judgments for the down and up motions, and for the starting and end points will be explained. In the consecutive image processing, CPU 95 takes charge of the timing control between the parts of the system.

As shown in FIG. 19, One stroke ST during writing a character has a writing starting point S and a writing end point E. CCD monitor camera 98 takes pictures of the view of neighborhood of pen point α1, as shown in FIG. 20A. The dotted circle near the center of the circular monitor image MD will be called as center circle SC.

Hereinbelow, the process will be explained according to the flow chart of FIG. 22. First, CCD camera 98 takes up an image of time t, as shown in FIG. 20A (see step SP1). Here, a micro-time is assigned as Δt (for example, Δt=33 [msec]).

When the micro-time Δt passes from time t, a similar image is taken up again (see step SP2). The difference between the above two images is then calculated (see step SP3).

Next, for both of the images of times t and t+Δt, it is judged whether or not the inside of center circle SC except the pen point is blanc (see step SP4). If judged "yes", it is recognized that the pen exists in the air (i.e., in the pen-up state) at time t (see step SP5), time t is then renewed as "t=t+Δt" (see step SP6), and the process returns to step SP1. On the other hand, if judged "no", it is further judged whether or not images of t and t+Δt differ from each other in connection with the black line in center circle SC (see step SP7).

If judged "yes" in step SP7, it is recognized that the pen performs a stroke (i.e., in the pen-down state) at time t (see step SP8), time t is then renewed as "t=t+Δt" (see step SP9), and the process returns to step SP1. On the other hand, if judged "no" in step SP7, it is further judged whether or not the inside of center circle SC except the pen point is blanc with regard to the image of time t (see step SP10).

If judged "yes" in step SP10, it is recognized that time t is a starting point of writing of the pen (i.e., the moment of the pen-down motion) (see step SP11), time t is then renewed as "t=t+Δt" (see step SP12), and the process returns to step SP1. On the other hand, if judged "no" in step SP10, it is recognized that time t is an end point of a stroke (see step SP13).

Next, it is judged whether any writing does not occur in a further time T or more (for example, T=1 |msec|) (see step SP14). This judgment is performed in a manner similar to the above process for judging whether or not the inside of center circle SC except the pen point is blanc with regard to the image of time t. If judged that no writing has occurred, it is recognized that the writing of the character has finished (see step SP16), and the process ends. On the other hand, if judged that some writing has occurred, time t then renewed as "t=t+Δt" (see step SP15) and it is recognized that the pen is in the course of proceeding to a next stroke, and the process returns to step SP1.

For example, if an image as shown in FIG. 20A is obtained at time t and another image as shown in FIG. 20B is obtained at time t+Δt, time t is recognized as the starting point of a stroke. On the other hand, if the same images as shown in FIG. 21 are obtained at times t and t+Δt, time t is recognized as the end point of a stroke.

Now the explanations for the judgments of the starting and end points of the stroke and the judgments of the pen-down and pen-up are concluded.

Regarding the method for detecting the motions of pencil α based on acceleration signals $S_x$ and $S_y$ output from X- and Y-axis acceleration sensors 13 and 14 so as to recognizing the handwriting information, same method as that of embodiment 1 or 2 can be adopted.

Additionally, also in the apparatus D, a display made of LCD and so on may be provided on the body to visually feedback the recognized characters to the user.

It is also possible to provide a signal receiver as embodiment 2 so as to receive signals transmitted from an external device like a pager and to display the information corresponding to the signals on the above display.

Another method of using an image pick-up tube monitor and the like is possible for taking monitor image MD around the pen point α1, besides the method of using CCD as the present embodiment.

Variation of the Apparatus

Figure 23:
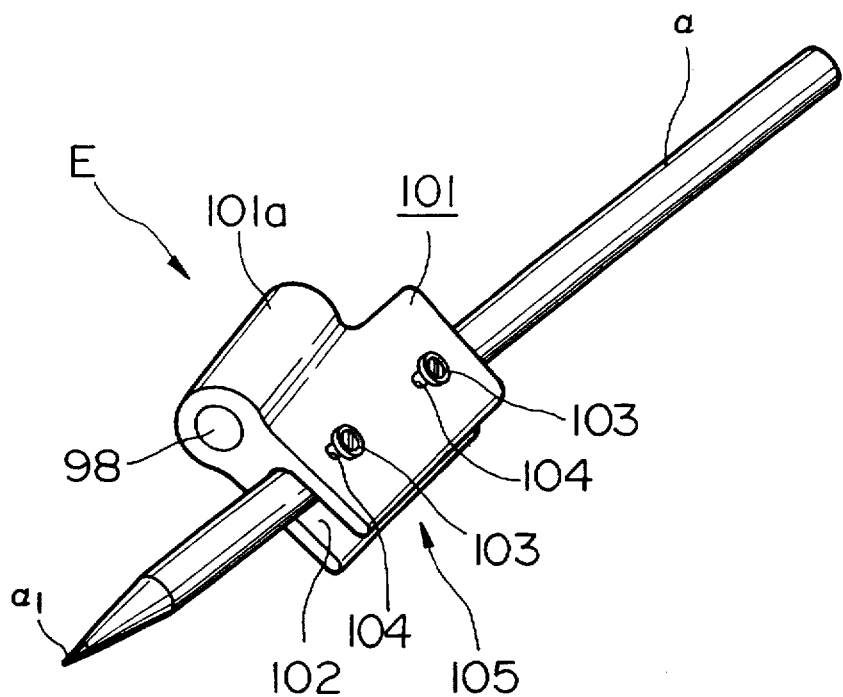
FIG. 23 is a perspective view of the handwriting information detecting apparatus as a variation of the third embodiment.

FIG. 23 is a perspective view of the handwriting information detecting apparatus E as a variation of apparatus D in FIG. 16. In the figure, reference numeral 101 indicates a body of the apparatus, and reference numeral 101a indicates a CCD container which is formed as a part of the body 101. Reference numeral 102 indicates an indentation, provided at an end of the body 101, for holding a writing tool, reference numeral 103 indicates screws for pressing and fixing the writing tool which is inserted in the indentation 102 by their points, via tapped holes 104 provided outside body 101.

Therefore, apparatus E detachably holds any writing tool by using indentation 102 of body 101 and screws 103, not by using elastic force of the coil spring as the case of apparatus D. Other parts of apparatus E are the same as those of apparatus D which were explained above.

As explained above, in this third embodiment, the CCD monitor camera contained in the apparatus monitors and takes pictures of the neighborhood of the pen point of the writing tool and the handwriting information is detected based on the monitored images; thus, there is an advantage that the up and down motions of any writing tool can be certainly recognized.

What is claimed is:

1. A handwriting information detecting method comprising the steps of:

detachably holding a user selectable writing tool in a writing tool holder comprising at least one acceleration sensor;

detecting a motion of the writing tool, held by the writing tool holder, based on at least one acceleration signal output from the at least one acceleration sensor when the writing tool is grasped by fingers; and recognizing handwriting information of a character or a figure written by the writing tool according to the detected motion thereof, and outputting the information.

2. A handwriting information detecting method as claimed in claim 1, wherein:

X- and Y-axis acceleration sensors, the axes corresponding to those of the two dimensional rectangular coordinates assigned to a writing surface for the writing tool, are used as the at least one acceleration sensor; and the writing tool holder is oriented to a predetermined direction when the writing tool and the holder are grasped by the fingers, whereby the axial directions of the X- and Y-axis acceleration sensors are aligned in predetermined directions.

3. A handwriting information detecting method as claimed in claim 2, wherein a Z-axis acceleration sensor whose axial direction corresponds to the direction of the axis of the writing tool is further used as the at least one acceleration sensor.

4. A handwriting information detecting method as claimed in claim 3, wherein the axial direction of the Z-axis acceleration sensor is perpendicular to each of the axial directions of the X- and Y-axis acceleration sensors.

5. A handwriting information detecting method as claimed in claim 3, wherein:

the step of detecting a motion of a writing tool is performed in a manner such that in case the acceleration signal output from the Z-axis acceleration sensor is a positive signal in an up motion of the writing tool, if the positive acceleration signal exceeds a predetermined positive threshold, it is judged that the writing tool is in an up-state, while if the negative acceleration signal exceeds a predetermined negative threshold, it is judged that the writing tool is in a down-state;

while in case the acceleration signal output from the Z-axis acceleration sensor is a negative signal in an up motion of the writing tool, if the negative acceleration signal exceeds a predetermined negative threshold, it is judged that the writing tool is in a up-state, while if the positive acceleration signal exceeds a predetermined positive threshold, it is judged that the writing tool is in a down-state.

6. A handwriting information detecting method as claimed in claim 2, wherein:

the step of detecting a motion of a writing tool comprises a step of twice integrating acceleration data which are represented by acceleration signals output from the X- and Y-axis acceleration sensors; and the step of recognizing and outputting the handwriting information involves recognizing the handwriting information based on results of the two-times integration.

7. A handwriting information detecting method as claimed in claim 2, wherein:

the step of detecting a motion of a writing tool comprises a step of once integrating acceleration data which are represented by acceleration signals output from the X- and Y-axis acceleration sensors; and the step of recognizing and outputting the handwriting information involves recognizing the handwriting information based on results of the one-time integration.

8. A handwriting information detecting method as claimed in claim 2, wherein:

the step of recognizing and outputting the handwriting information involves recognizing the handwriting information based on acceleration data which are represented by acceleration signals output from the X- and Y-axis acceleration sensors.

9. A handwriting information detecting method as claimed in claim 1, wherein the step of detecting a motion of a writing tool further comprises steps of:

detecting pressure acting on the tip of a finger which grasps the writing tool; and judging the motion of the writing tool according to the detected pressure.

10. A handwriting information detecting method as claimed in claim 9, wherein:

the step of judging the motion of the writing tool is performed in a manner such that if the detected pressure varies as if it exceeds a given down-threshold, the down motion of the writing tool has occurred, while if the detected pressure varies as if it goes below a given up-threshold, the up motion of the writing tool has occurred.

11. A handwriting information detecting method as claimed in claim 10, wherein:

X- and Y-axis acceleration sensors, the axes corresponding to those of the two dimensional rectangular coordinates assigned to a writing surface for the writing tool, are used as the at least one acceleration sensor; and the writing tool holder is oriented to a predetermined direction when the writing tool and the holder are grasped by fingers, whereby the axial directions of the X- and Y-axis acceleration sensors are aligned in predetermined directions.

12. A handwriting information detecting method as claimed in claim 9, wherein the step of detecting pressure acting on the tip of a finger involves detecting pressure acting on the finger cushion of the tip of an index finger.

13. A handwriting information detecting method as claimed in claim 9, wherein the step of detecting pressure acting on the tip of a finger is performed by using a sensor selected from the group consisting of a pressure sensitive sensor, a strain gauge, and a pair of a light-emitting element and a light-receiving element.

14. A handwriting information detecting method as claimed in claim 13, wherein the strain gauge detects strain corresponding to a degree of deflection of an elastic beam which is pushed by the finger cushion of the tip of an index finger, the amount of the strain corresponding to the level of the pressure.

15. A handwriting information detecting method as claimed in claim 13, wherein:

the pair of the light-emitting element and the light-receiving element is arranged in a manner such that the pair touches with the finger cushion of the tip of an index finger, and scattered light of near infrared light which is irradiated by the light-emitting element is received by the light-receiving element to be converted into a photoelectric pulse wave; and the step of judging the motion of the writing tool is performed based on a variation of the amplitude of the photoelectric pulse wave, the amplitude varying according to a variation of the pressure of the pushing of the light-emitting element and the light-receiving element into the finger cushion.

16. A handwriting information detecting method as claimed in claim 1, wherein the step of detecting a motion of a writing tool further comprises steps of:

monitoring the neighborhood of the point of the writing tool and outputting pen-point monitoring information; and judging the motion of the writing tool according to the output pen-point monitoring information.

17. A handwriting information detecting method as claimed in claim 16, wherein the pen-point monitoring information is image information.

18. A handwriting information detecting method as claimed in claim 17, wherein the step of judging the motion of the writing tool comprises steps of:

taking up a first monitor image at a time t;

taking up a second monitor image when a preset time has passed from the time t; and detecting difference between the first and second images, and the judgment is performed based on the first and second images, and the detected difference.

19. A handwriting information detecting method as claimed in claim 18, wherein the step of judging the motion of the writing tool further comprises steps of:

judging whether or not the background image except the point of the writing tool is blank for both of the first and second images;

recognizing that the writing tool is not in the midst of a stroke if judged that the background image is blank for both of the first and second images in the step of judging whether the background image is blank for the images, while if judged that it is not blank for any one of images in the same step, further judging whether or not any difference exists between the first and second images;

recognizing that the writing tool is in the midst of a stroke if judged that any difference exists in the step of judging whether the difference exists, while if judged that no difference exists in the same step, further judging whether or not the background image except the point of the writing tool is blank for the first image;

recognizing that the time t is a starting point of a stroke of the writing tool if judged that the background image is blank in the step of judging whether the background image is blank for the first image, while if judged that it is not blank in the same step, recognizing that the time t is an end point of a stroke of the writing tool;

judging whether or not any writing occurs in a further predetermined time when time t is recognized as the end point of the stroke; and recognizing that writing of a character has finished if judged that no further writing has occurred in the step of judging whether any writing occurs, while if judged that some further writing has occurred in the same step, recognizing that another new stroke starts.

20. A handwriting information detecting apparatus comprising:

a writing tool holder for detachably holding a user selectable writing tool;

at least one acceleration sensor, provided at the writing tool holder, for detecting acceleration of the writing tool which is grasped by fingers; and a handwriting information recognition circuit for recognizing information of handwriting performed by the writing tool based on the output of the at least one acceleration sensor.

21. A handwriting information detecting apparatus as claimed in claim 20, wherein the writing tool holder comprises:

a holding part for detachably holding a writing tool by clamping the writing tool from both sides of its axis; and a means for elastically urging the holding part.

22. A handwriting information detecting apparatus as claimed in claim 20, wherein the writing tool holder comprises:

an insertion part wherein a writing tool is inserted; and a pressing and fixing means, provided at the insertion part, for detachably pressing and fixing the writing tool.

23. A handwriting information detecting apparatus as claimed in claim 20, wherein:

X- and Y-axis acceleration sensors, the axes corresponding to those of the two dimensional rectangular coordinates assigned to a writing surface for the writing tool, are provided as the at least one acceleration sensor; and the writing tool holder is grasped with the writing tool by the fingers, and has a grasping part for orienting the direction of the writing tool holder so as to align the axial directions of the X- and Y-axis acceleration sensors in predetermined directions.

24. A handwriting information detecting apparatus as claimed in claim 23, wherein a Z-axis acceleration sensor whose axial direction corresponds to the axis of the writing tool is further used as the at least one acceleration sensor.

25. A handwriting information detecting apparatus as claimed in claim 24, wherein the axial direction of the Z-axis acceleration sensor is perpendicular to each of the axial directions of the X- and Y-axis acceleration sensors.

26. A handwriting information detecting apparatus as claimed in claim 23, wherein the handwriting information recognition circuit comprises:

an amplifier for amplifying and outputting each signal output from each of the X- and Y-axis acceleration sensors;

an integrator for integrating acceleration data which are represented by the amplified acceleration signals output from the amplifier and outputting handwriting data of the writing tool; and a recognizer for recognizing the handwriting information according to the handwriting data from the integrator.

27. A handwriting information detecting apparatus as claimed in claim 26, wherein the integrator twice integrates the acceleration data.

28. A handwriting information detecting apparatus as claimed in claim 20, wherein:

the recognized handwriting information is character information, and the apparatus further comprising a signal transmitter for coding and outputting the character information.

29. A handwriting information detecting apparatus as claimed in claim 20, further comprising:

an elastic beam which is projected from the writing tool holder, wherein the tip of the index finger touches the end of the beam; and a pressure detecting means, provided at the elastic beam, for detecting pressure which is applied by the finger tip to the elastic beam, wherein the handwriting information recognition circuit recognizes the handwriting information based on output of the pressure detecting means in addition to the output of the at least one acceleration sensor.

30. A handwriting information detecting apparatus as claimed in claim 29, wherein the pressure detecting means has a sensor selected from the group consisting of a pressure sensitive sensor fixed on the end of the elastic beam, a pair of a light-emitting element and a light-receiving element, and a strain gauge fixed on a part near the root of the elastic beam.

31. A handwriting information detecting apparatus as claimed in claim 29, wherein:

X- and Y-axis acceleration sensors, the axes corresponding to those of the two dimensional rectangular coordinates assigned to a writing surface for the writing tool, are provided as the at least one acceleration sensor; and the writing tool holder is grasped with the writing tool by the fingers, and has a grasping part for orienting the direction of the writing tool holder so as to align the axial directions of the X- and Y-axis acceleration sensors in predetermined directions.

32. A handwriting information detecting apparatus as claimed in claim 20, further comprising a display for displaying the handwriting information output from the handwriting information recognition circuit.

33. A handwriting information detecting apparatus as claimed in claim 32, wherein the display is an LCD.

34. A handwriting information detecting apparatus as claimed in claim 20, further comprising a receiving-signal display for receiving and displaying an information signal transmitted from an external device.

35. A handwriting information detecting apparatus as claimed in claim 20, further comprising:

a photographic monitor means for monitoring and taking pictures of the neighborhood of the point of the writing tool and outputting a pen-point monitoring picture signal; and the handwriting information recognition circuit recognizes the handwriting information based on the output of the pen-point monitoring picture signal in addition to the output of the at least one acceleration sensor.

36. A handwriting information detecting apparatus as claimed in claim 35, wherein the photographic monitor means is selected from the group consisting of a CCD monitor camera and an image pick-up tube monitor.

37. A handwriting information detecting apparatus as claimed in claim 20, comprising a power source which includes solar cells.

* * * * *